US008166836B2

(12) United States Patent
Rudduck

(10) Patent No.: US 8,166,836 B2
(45) Date of Patent: May 1, 2012

(54) MULTI-FUNCTION TOOL

(75) Inventor: Dickory Rudduck, Seaforth (AU)

(73) Assignee: Telezygology, Inc., Chicago, IL (US)

( * ) Notice: Subject to any disclaimer, the term of this patent is extended or adjusted under 35 U.S.C. 154(b) by 0 days.

(21) Appl. No.: 10/336,649

(22) Filed: Jan. 3, 2003

(65) Prior Publication Data

US 2004/0003683 A1 Jan. 8, 2004

Related U.S. Application Data

(63) Continuation of application No. PCT/AU01/00812, filed on Jul. 6, 2001.

(30) Foreign Application Priority Data

Jul. 6, 2000 (AU) ....................................... PQ8613

(51) Int. Cl.
*G01N 19/00* (2006.01)

(52) U.S. Cl. ....................................... 73/865.9; 403/324

(58) Field of Classification Search .................... 73/761, 73/862.21, 862.23, 865.9; 70/276; 292/251.5
See application file for complete search history.

(56) References Cited

U.S. PATENT DOCUMENTS 3,120,149 A 2/1964 Dickie
3,134,404 A 5/1964 Ziccardi
3,214,832 A * 11/1965 Schwinghamer ............ 29/426.5
3,292,542 A 12/1966 White
3,334,536 A 8/1967 Armstrong
3,395,555 A 8/1968 Hickman
3,596,958 A 8/1971 Bowerman
3,745,736 A 7/1973 Fischer et al.
3,783,429 A 1/1974 Otte
3,855,827 A 12/1974 Hallman et al.
3,911,534 A 10/1975 Martens et al.
3,940,935 A 3/1976 Richardson et al.
3,947,930 A 4/1976 Martens et al.
3,962,910 A * 6/1976 Spyridakis et al. ............. 73/761
3,974,669 A 8/1976 Stackhouse
4,006,567 A 2/1977 Flannery
4,012,813 A 3/1977 Martens et al.

(Continued)

FOREIGN PATENT DOCUMENTS

AU 44961/59 7/1959

(Continued)

OTHER PUBLICATIONS

"Simple Network—The Lin Bus" http://www.microchip.com/1010/edit/proceed/archive9_311/index.htm, Jan. 13, 2003.

(Continued)

*Primary Examiner* — Hezron E Williams
*Assistant Examiner* — Nashmiya Fayyaz
(74) *Attorney, Agent, or Firm* — Heather A. Kartsounes

(57) ABSTRACT

The invention relates to a tool which has more than one function. As a first function, the tool is capable of activating a fastening element, either by direct physical contact or by remote activation. As a second function, the tool is capable of detecting an attribute of the fastening element. The attribute can include position or location of the fastening element, status of the fastening element, identity of the fastening element, environmental factors affecting the fastening element, size of the fastening element, sequence in which the fastening element must be activated, history of the fastening element, authorization requirements in relation to the fastening element, or activation requirements of the fastening element.

13 Claims, 11 Drawing Sheets

U.S. PATENT DOCUMENTS

| | | | | |
|---|---|---|---|---|
| 4,016,914 | A | 4/1977 | Zurko | |
| 4,096,802 | A | 6/1978 | Waln | |
| 4,176,250 | A | 11/1979 | Berglind | |
| 4,195,868 | A | 4/1980 | Kalen et al. | |
| 4,223,799 | A | 9/1980 | Eyster et al. | |
| 4,339,853 | A | 7/1982 | Lipschitz | |
| 4,375,637 | A | 3/1983 | Desjardins | |
| 4,382,711 | A | 5/1983 | Lafosse et al. | |
| 4,425,117 | A | 1/1984 | Hugemann et al. | |
| 4,453,449 | A | 6/1984 | Hollmann | |
| 4,507,115 | A | 3/1985 | Kambara et al. | |
| 4,515,045 | A | 5/1985 | Gnatchenko et al. | |
| 4,518,285 | A | 5/1985 | Weber et al. | |
| 4,523,356 | A | 6/1985 | Charlot, Jr. | |
| 4,539,929 | A | 9/1985 | Sestak et al. | |
| 4,559,512 | A | 12/1985 | Yaeger et al. | |
| 4,586,335 | A | 5/1986 | Hosoda et al. | |
| 4,602,908 | A | 7/1986 | Kroeber | |
| 4,620,428 | A | 11/1986 | Kopesky | |
| 4,624,443 | A | 11/1986 | Eidsmore | |
| 4,651,136 | A | 3/1987 | Anderson et al. | |
| 4,705,070 | A | 11/1987 | Eidsmore | |
| 4,728,217 | A | 3/1988 | Fink | |
| 4,767,337 | A | 8/1988 | Kawasaki et al. | |
| 4,806,815 | A | 2/1989 | Honma et al. | |
| 4,829,767 | A | 5/1989 | Mecca | |
| 4,841,100 | A | 6/1989 | Ignasiak | |
| 4,845,998 | A * | 7/1989 | DeMartelaere et al. | 73/862.23 |
| 4,855,729 | A | 8/1989 | Takeuchi et al. | |
| 4,872,584 | A | 10/1989 | Sakai et al. | |
| 4,899,131 | A | 2/1990 | Wilk et al. | |
| 4,919,464 | A | 4/1990 | Richards | |
| 4,926,699 | A * | 5/1990 | Salce, Sr. | 73/862.21 |
| 4,929,135 | A | 5/1990 | Delarue et al. | |
| 4,934,885 | A | 6/1990 | Woods et al. | |
| 4,960,760 | A | 10/1990 | Wang et al. | |
| 4,994,722 | A * | 2/1991 | Dolan et al. | 318/480 |
| 5,014,794 | A | 5/1991 | Hansson | |
| 5,061,112 | A | 10/1991 | Monford, Jr. | |
| 5,071,064 | A | 12/1991 | AbuJudom, II et al. | |
| 5,076,623 | A | 12/1991 | Richards | |
| 5,077,872 | A | 1/1992 | Guthammar | |
| 5,095,417 | A | 3/1992 | Hagiwara et al. | |
| 5,108,214 | A | 4/1992 | Milam | |
| 5,120,175 | A | 6/1992 | Arbegast et al. | |
| 5,145,227 | A | 9/1992 | Monford, Jr. | |
| 5,160,233 | A | 11/1992 | Darin | |
| 5,164,154 | A | 11/1992 | Brown et al. | |
| 5,170,801 | A | 12/1992 | Casper et al. | |
| 5,188,405 | A | 2/1993 | Maccaferri | |
| 5,203,844 | A | 4/1993 | Leonard | |
| 5,221,171 | A | 6/1993 | Rudoy et al. | |
| 5,241,451 | A | 8/1993 | Walburn et al. | |
| 5,254,837 | A | 10/1993 | Grimaldi et al. | |
| 5,269,213 | A | 12/1993 | Coneski et al. | |
| 5,337,459 | A | 8/1994 | Hogan | |
| 5,366,254 | A | 11/1994 | Tucchio et al. | |
| 5,386,713 | A * | 2/1995 | Wilson | 70/280 |
| 5,387,110 | A | 2/1995 | Kantner et al. | |
| 5,439,310 | A | 8/1995 | Evenson et al. | |
| 5,466,083 | A | 11/1995 | Hogg | |
| 5,476,014 | A | 12/1995 | Lampe et al. | |
| 5,482,467 | A | 1/1996 | Nolf et al. | |
| 5,485,733 | A | 1/1996 | Hoffman | |
| 5,570,992 | A * | 11/1996 | Lemelson | 414/744.3 |
| 5,600,977 | A | 2/1997 | Piron et al. | |
| 5,629,662 | A | 5/1997 | Floyd et al. | |
| 5,693,987 | A * | 12/1997 | Krucoff | 307/10.2 |
| 5,712,469 | A | 1/1998 | Chaffin et al. | |
| 5,715,712 | A | 2/1998 | West | |
| 5,771,742 | A | 6/1998 | Bokaie et al. | |
| 5,775,524 | A | 7/1998 | Dunham | |
| 5,790,043 | A * | 8/1998 | Hettich et al. | 340/5.62 |
| 5,831,820 | A | 11/1998 | Huang | |
| 5,870,914 | A | 2/1999 | Dawson | |
| 5,901,894 | A | 5/1999 | Melocco | |
| 5,910,894 | A | 6/1999 | Pryor | |
| 5,917,726 | A | 6/1999 | Pryor | |
| 5,933,086 | A * | 8/1999 | Tischendorf et al. | 340/5.22 |
| 5,936,544 | A * | 8/1999 | Gonzales et al. | 340/5.22 |
| 5,964,487 | A | 10/1999 | Shamblin | |
| 6,008,992 | A | 12/1999 | Kawakami et al. | |
| 6,075,454 | A * | 6/2000 | Yamasaki | 340/5.61 |
| 6,084,498 | A | 7/2000 | Stelter et al. | |
| 6,089,253 | A | 7/2000 | Stehling et al. | |
| 6,243,022 | B1 * | 6/2001 | Furukawa | 340/825.72 |
| 6,244,889 | B1 | 6/2001 | James | |
| 6,367,843 | B1 * | 4/2002 | Fetzer | 285/24 |
| 6,438,954 | B1 | 8/2002 | Goetz et al. | |
| 6,450,725 | B1 | 9/2002 | Roth et al. | |
| 6,461,185 | B2 | 10/2002 | James | |
| 6,499,907 | B1 | 12/2002 | Baur | |
| 6,553,321 | B2 | 4/2003 | Siegel et al. | |
| 6,588,790 | B2 * | 7/2003 | Hall | 280/513 |
| 6,598,684 | B2 * | 7/2003 | Watanabe | 73/862.23 |
| 6,666,330 | B2 * | 12/2003 | Sedon et al. | 206/387.11 |
| 6,745,941 | B1 * | 6/2004 | Vega | 235/382 |
| 6,872,439 | B2 | 3/2005 | Fearing et al. | |
| 6,944,920 | B2 | 9/2005 | Browne et al. | |
| 7,217,059 | B1 | 5/2007 | Rudduck et al. | |
| 2002/0040949 | A1 | 4/2002 | Brei et al. | |
| 2002/0113499 | A1 | 8/2002 | von Behrens et al. | |
| 2002/0196123 | A1 * | 12/2002 | Diehl et al. | 340/5.64 |
| 2003/0019210 | A1 | 1/2003 | Gummin et al. | |
| 2003/0020638 | A1 * | 1/2003 | Sari et al. | 340/995 |
| 2004/0003683 | A1 | 1/2004 | Rudduck | |
| 2004/0104580 | A1 | 6/2004 | Spiessl et al. | |
| 2006/0012191 | A1 | 1/2006 | Brei et al. | |

FOREIGN PATENT DOCUMENTS

| | | | | |
|---|---|---|---|---|
| BE | 840618 | A | | 10/1976 |
| CN | 1320093 | | | 10/2001 |
| DE | 2552039 | A1 | | 5/1977 |
| DE | 10104833 | | | 8/2002 |
| EP | 297552 | A2 | | 1/1989 |
| EP | 297552 | B1 | | 1/1989 |
| EP | 324083 | A1 | | 7/1989 |
| GB | 1388973 | | | 4/1975 |
| GB | 2131869 | A | | 6/1984 |
| GB | 2260162 | A | | 4/1993 |
| JP | 63191526 | A | * | 8/1988 |
| JP | UMH 5-96532 | A | | 12/1993 |
| JP | 8241753 | A | | 9/1996 |
| RU | 2019739 | C1 | | 9/1994 |
| RU | 2091554 | | | 9/1997 |
| RU | 2094325 | | | 10/1997 |
| SU | 787200 | | | 12/1980 |
| SU | 1348125 | | | 10/1987 |
| SU | 1838548 | | | 8/1993 |
| WO | WO 95/31313 | | | 11/1995 |
| WO | WO-96/09870 | A1 | | 4/1996 |
| WO | WO-96/23942 | A1 | | 8/1996 |
| WO | WO-99/43961 | A1 | | 9/1999 |
| WO | WO-99/47819 | | | 9/1999 |
| WO | WO 00/64639 | | | 11/2000 |
| WO | WO-01/69547 | | | 9/2001 |
| WO | WO-02/07971 | | | 1/2002 |
| WO | WO 2004/001235 | | | 12/2003 |
| WO | WO-2004/010011 | | | 1/2004 |
| WO | WO-2004/046568 | | | 6/2004 |
| WO | WO-2004/082444 | | | 9/2004 |
| WO | WO-2004/085860 | | | 10/2004 |
| WO | WO-2004/101216 | | | 11/2004 |

OTHER PUBLICATIONS

"OBD-II", http://obdii.com/background.html.
"Target Applications," http://www.lin-subbus.org/main.asp?cls=online&method=view&id=970.
Nice, K., "How Car Computers Work", http://howstuffworks.lycoszone.com/car-computer.htm/printable.
International Search Report for International Patent Application No. PCT/AU03/00759, filed Jun. 19, 2003.
"Magnetic Lock", Aug. 28, 2002.
ENVIROEQUIP, "A Locking Well Cap with a Magnetic Key", Aug. 30, 2002.
CARFIX "Magnet Sear Belt", Aug. 29, 2002.

Custodian® Hydrant Lock, Sep. 9, 2002.
Warwick Manufacturing Group "Magnetic Lock Holds Injection Molding Tools", Sep. 9, 2002.
Protect Enfant Inc. Cabinet and Drawer Magnetic Latch, Sep. 9, 2002.
Nova Design Group, "Nova Bi-Polar Device", Sep. 9, 2002.
SEGUFIX "Bandage System: Component Parts", Sep. 9, 2002.
Security Co. "MagLatch Series", Sep. 9, 2002.
SEGUFIX "Segufix Bandage System", Nov. 29, 2002.
English Translation of Office Action for Japanese Patent Application No. P2006-536980 mailed Nov. 12, 2008.
US 6,264,473, 07/2001, Bullinger et al. (withdrawn)

* cited by examiner

MULTI-FUNCTION TOOL

CROSS REFERENCE TO RELATED APPLICATIONS

This application is a continuation of International Patent Application No. PCT/AU01/00812, filed Jul. 6, 2001, which claims priority to Australian Patent Application No. PQ8613, which was filed on Jul. 6, 2000. The contents of International Patent Application No. PCT/AU01/00812 and Australian Patent Application No. PQ8613 are herein incorporated by reference.

TECHNICAL FIELD

This invention relates to tools with more than one function. One particular area of interest in relation to the tool of this invention is that of fasteners. The invention in various embodiments can be applied to a wide field of fasteners, in a plurality of industries.

This invention can be applied to traditional fasteners, including nuts and screws. In certain embodiments, the invention may also be applicable to fasteners capable of fixing or release by remote means. Reference is made to International Patent Application No. PCT/AU99/00185, published as WO 99/47819, the contents of which are incorporated herein by reference.

BACKGROUND ART

Prior art tools are generally specific to a particular fastener. For example, screw fasteners are loosened or tightened by a screwdriver. A screw with a slot in its head will require a different screwdriver from a "Phillip's head" screw. Nuts can be tightened or loosened by means of a wrench, using a different wrench for each differently-sized nut. Alternately, a nut can be manipulated by an adjustable wrench, which can be used for a particular range of nut sizes.

Problems can be encountered when a fastener is not normally visible—for example, because it is hidden under a cowling—or is difficult to see—for example, because of lack of light. In such circumstances, it is difficult to ascertain the precise type of tool which is necessary to manipulate the fastener.

It is an aim of this invention, in one embodiment, to provide a multifunction tool which can be used to lock or unlock fasteners in circumstances where the fasteners are not normally visible. It is a further object of this invention, in another embodiment, to provide a multifunction tool which is capable of reporting on attributes of the fastener, such as size, type, "hand"—e.g., right hand or left hand, polarity, male or female nature, fastening status, and damage. It is yet a further object of this invention, in yet another embodiment, to provide a tool which is capable of detecting an attribute of a fastener, such as the size of a fastener, and of automatically adjusting itself in the appropriate manner, even though the fastener may not be visible. Other aims will be apparent from the disclosure below.

SUMMARY OF THE INVENTION

Accordingly, this invention provides a tool for activating a fastening element, the tool including:

a first function whereby the tool is capable of activating the fastening element, and a second function whereby the tool is capable of detecting an attribute of the fastening element, wherein the or each attribute is selected from the group consisting of:

location of the fastening element, status of the fastening element (excluding torque or angle), identification of the fastening element, one or more environmental factors affecting the fastening element, size of the fastening element, sequence of activation of the fastening element compared with other fastening elements, history of the fastening element, authorization requirements of the fastening element, and activation requirements of the fastening element (excluding torque or angle).

The tool may include a plurality of parts.

In activating the fastening element, the tool will usually fix or release the fastening element. The fastening element may be fixed to or released from a substrate or a second fastening element. For example, the tool may be capable of fixing or releasing a screw to or from masonry. As a further example, the tool may be capable of fixing or releasing a nut to or from a bolt. As another example, the fastening element may be one element of a fastener disclosed in International Patent Application No. PCT/AU99/00185.

Depending on the nature of the fastening element, the activation of the fastening element may be effected by direct physical contact between the tool and the fastening element. However, in some embodiments the tool may be capable of activating the fastening element by remote activation without direct physical contact. As an example of direct physical contact, the tool of the invention may be a wrench having a head with spaced teeth for fitting around a fastening element, being a nut. Remote activation may be effected by any suitable means, for instance energy transmission and/or digital instruction. Energy transmission may be effected by, for example, electromagnetic pulse, induction, ultrasound, infra red, radio frequency, electromagnetic, microwave, or ultrasound energy.

As to the second function of the tool, the tool can detect the attribute of the fastening element in any appropriate way. For example, detection may be effected using infra red, radio frequency, electromagnetic, microwave, or ultrasound technology.

The attribute to which the second function relates may be chosen from a wide range, namely, position or location of the fastening element, status of the fastening element (excluding torque or angle), identity of the fastening element, environmental factors affecting the fastening element, size of the fastening element, sequence in which the fastening element must be activated, history of the fastening element, authorization requirements in relation to the fastening element, and activation requirements of the fastening element (excluding torque or angle). However, the tool may also be capable of detecting the torque of the fastening element, the torque activation requirements of the fastening element, or the angle of the fastening element, in addition to detection of another attribute.

Detection of the position or location of the fastening element can be particularly important when the location cannot be established by observation. This may occur, for example, because the fastening element is behind a cowling or masked by something else. It may also occur because the fastening element is intended to be hidden, such as behind a panel as disclosed in International Patent Application No. PCT/AU99/00185. When the tool of the invention locates a fastening element, it preferably provides a visible sign, such as the illumination of a display or an audible sound, such as a "beep". In addition, the tool of the invention may be capable of locating a first fastening element in a set of a plurality of fastening elements which need to be coupled or uncoupled in a set sequence.

Detection of the position of the fastening element may take place by macro or micro navigation, so that the position of the element may be established globally and/or relatively. This function may be carried out by any suitable technology, including global positioning systems, detection by sound or other waves, and so on.

The status of the fastening element may be represented by the locked or unlocked status of the fastening element or whether the fastening element is fixed or released to a substrate or a second fastening element.

The identification of the fastening element may relate to its type. For example, if the fastening element is a screw, the identification may be as to whether it has a slit or "Phillips head". Detection of identity may also show whether the fastening element has a "north" or "south" polarity, whether, being a screw, it is right handed or left handed, whether the fastener is of the male or female type, and so on. The tool of the invention may identify indicia, such as a bar code. The tool of the invention may be programmed to operate only on fasteners which carry a particular identifying indicia, such as a bar code. The bar code may be readable in any way, including electronically. Thus, only authorized tools may be able to interact with particular types of fasteners. If desired, the capability of the tool to fix or release the fastener may depend on the identity of the fastener being acceptable to the tool. Consequently, if the fastener is of a manufacture not recognized by the tool, then the tool can be programmed to fail to actuate the fastener.

Environmental factors affecting the fastening element may include whether the fastening element has been damaged (such as by tampering or mechanical stress), the amount of force (e.g., torque or pressure) required to activate the fastening element, or the temperature of the fastening element. If desired, the tool of the invention may be capable of detecting and reporting whether a fastener has been welded, or similar default information.

Detection of the size of the fastening element can be useful, particularly in the case where there is direct physical contact between the tool and the fastening element. For example, the tool may detect the size of a fastening element being a nut and automatically adjust to that size so that the tool can tighten or loosen the nut.

In relation to sequence of activation, it may be desirable to have a plurality of fastening elements in a situation where they must be activated in a chosen sequence, either for ease of construction or for security purposes. Thus, the tool of the invention may detect the activation sequence required, so that the operator of the tool will be aware of the order in which various fastening elements must be activated.

The history of the fastening element can include whether the fastening element has been locked or unlocked previously and, if so, the number of times this has occurred. Another example of this type of attribute may relate to the need to service something associated with the fastening element and, if so, the type of service required. As an example, the fastening element may be securing a container of toner in a photocopier. The tool can detect the period of time since the fastening element was last released and hence the period since the toner was last changed.

In relation to authorization requirements, it can be useful for the tool to detect these in security situations, for example maintenance of aircraft where it is important to know that only authorized personnel have activated fastening elements. Authorization requirements can be useful in other situations, for example, so that a manufacturer can ensure that repairs are carried out by fully trained and authorized personnel.

With regard to activation requirements, these can include for example the type of activation required, whether activation is to be by energy transmission or physical contact and, in the case of energy transmission, whether this is to be electromagnetic, infra red, etc.

In the case of the aspect of the tool in which the tool detects an attribute of a fastening element and makes an adjustment in an appropriate way, some non-limiting examples of these will be given. The first is the case where the tool is a type of screwdriver and detects the type of head on a screw to be removed. In this example, the tool can detect whether the screw is of a regular slot type or the type known as a "Phillips head". The relevant size of the slot or Phillips head may also be detected. After detection, the appropriate bit to fit the screwhead is loaded into the operating head of the screwdriver by a suitable automatic means so that the screwdriver can then be used to tighten or loosen the screw. This aspect of the invention can have particular application to save time when a screwdriver is being used by a relatively unskilled person, or where the type and size of the screwhead is difficult to detect by visual inspection, for example, because of lack of light or because clear visual access to the screwhead is difficult.

As another example, the tool may be a wrench with adjustable jaws. When the wrench is brought into reasonable proximity to a nut being a fastening element to which the wrench is to be applied, the wrench detects (by a suitable means) the size of the nut and automatically adjusts the jaw span so that the jaws will fit properly around the nut. Alternatively, the wrench could provide a visual display of the nut size so that the jaws could be adjusted manually to the exact dimension, using a calibrated guide on the wrench.

The tool may detect a plurality of attributes of the fastening element. Such detection may be simultaneous or sequential. The or each attribute may also be detected via a remote center.

The tool may display information relating to the fastening element. As a further option, the tool may record relevant information relating to the fastening element, for example, in or on the tool itself or on the fastening element or by relay to a remote control center. The recording of information may be carried out in any suitable way. The tool may have the capability of writing updated information into its own memory, into a memory provided on the fastening element, or to the memory in a remote center. Any appropriate recording media may be used.

The tool may be capable of reporting or transmitting information relating to the fastening element to the fastening element or to a remote center, by any suitable means, including using infra red, radio frequency, electromagnetic, microwaves, and ultrasound technology. For example, transmission may be effected by a mobile phone transmission.

The function of reporting of attributes of the fastening element may be carried out using any suitable technology. The report itself may be displayed in a suitable manner on the tool, for example on a liquid crystal display or other type of screen or may be made available in some other manner, such as by a printout.

The tool of the invention may be capable of receiving information or reports from the fastening element or from a remote center. In this way, the fastening element may convey to the tool, either directly or via a remote center, information regarding encryption or any of the other attributes of the fastener. The tool may also be capable of transmitting the received report.

It is to be understood that the second function of the tool of detecting an attribute of the fastening element may be effected via a remote center rather than directly between the fastening element and the tool. The remote center may communicate, or download, directly to the tool such information as instruction manuals, authorized procedures, customer files, authorization, billing, encryption of fastening elements, service information, diagnostics, history, including history of parts replaced and various attributes of the fastening elements. The communication between the tool and the remote center is preferably two-way. This can be particularly useful with regard to controlling inventories, since the tool can provide a report on parts which have been replaced and which require to be ordered to maintain supplies. The remote center may include a database or may involve human interaction.

The tool of the invention, apart from the option of receiving information from a remote center, may have facility for insertion of information, for example, by inserting a memory card into the tool. The card can include information, for example, comprising a service manual, and the tool may be able to display instructions to the user, either on the tool itself or on associated hardware, such as a base for the tool. The information on the card may be encrypted or the tool may be encrypted so that only an authorized card can be inserted in the tool or read with the tool. In this way, maintenance of authorized repairs, etc., can be ensured.

The tool of the invention may, in interpreting the status of a fastener, instruct the user as to the type of action required to fix or release the fastener. In this way, the tool of the invention can be used by a relatively unskilled person.

BRIEF DESCRIPTION OF THE DRAWINGS

The invention will now be described in relation to certain non-limiting examples thereof, with reference to the accompanying drawings.

FIG. 3 is a perspective view, partially cut away, of a third embodiment of the tool according to the invention, while

FIG. 10 shows in sectional view, in situ between first and second elements, another embodiment of the connecting means, while

DETAILED DESCRIPTION OF THE INVENTION

Figure 1:
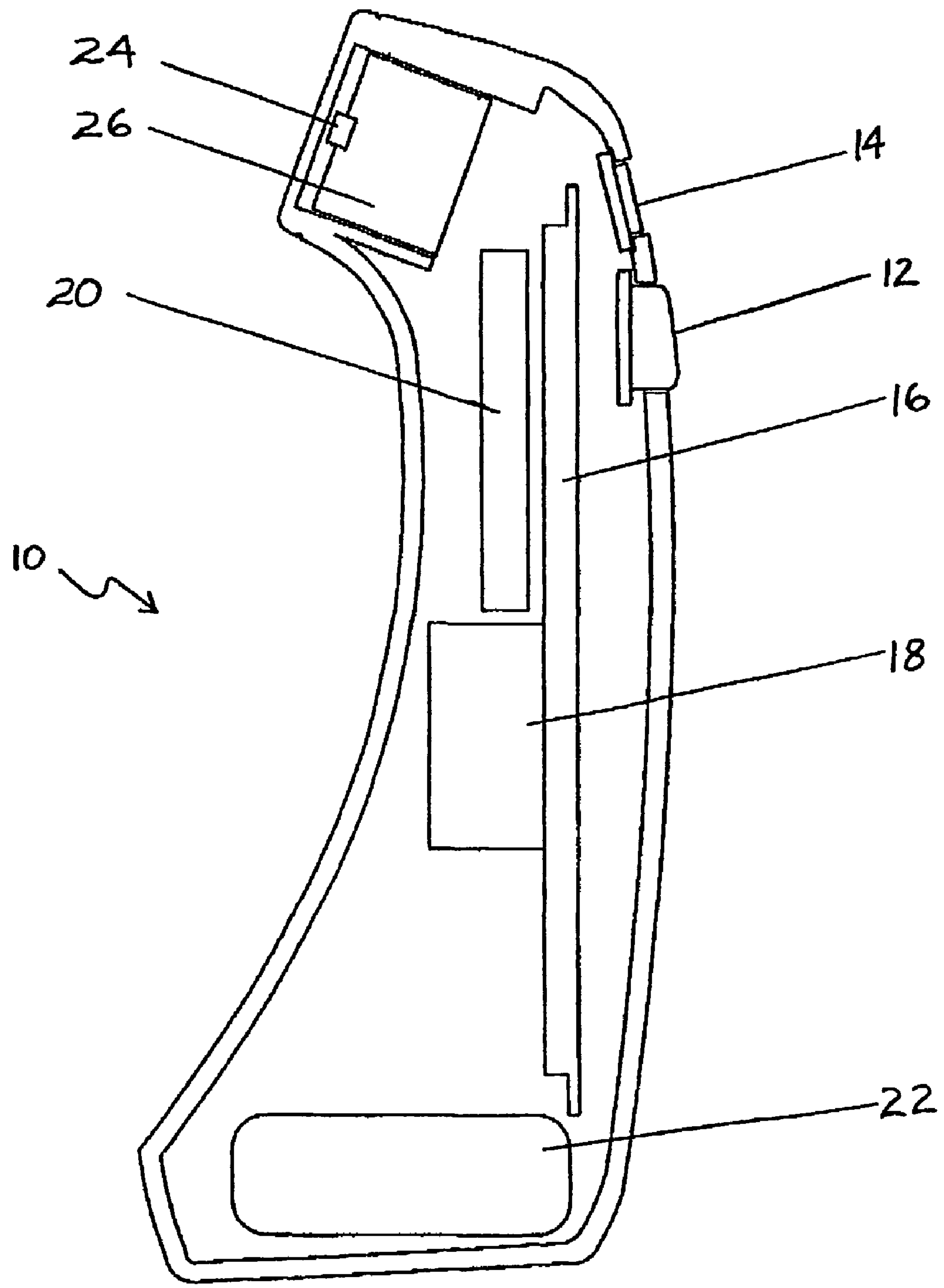
FIG. 1 is a schematic longitudinal sectional view of a first embodiment of a tool of the invention. In this embodiment, the tool is adapted to locate a fastening element and then activate it.

Referring first to FIG. 1, tool 10 has a user interface/menu selection button 12 and an associated display 14. Tool 10 also includes printed circuit board 16, capacitor 18, polarity logic circuit 20, power supply 22, Hall effect sensor 24, and solenoid 26.

When menu selection button 12 is changed to "detect" mode, tool 10 can detect the location of a suitable fastening element and indicate this by suitable output to display 14. Having located the fastening element, the user can then switch the menu selection button 12 to "activate" mode in order to fix or release the fastening element (not shown). Tool 10 uses electromagnetic energy both for detection and activation.

Figure 2:
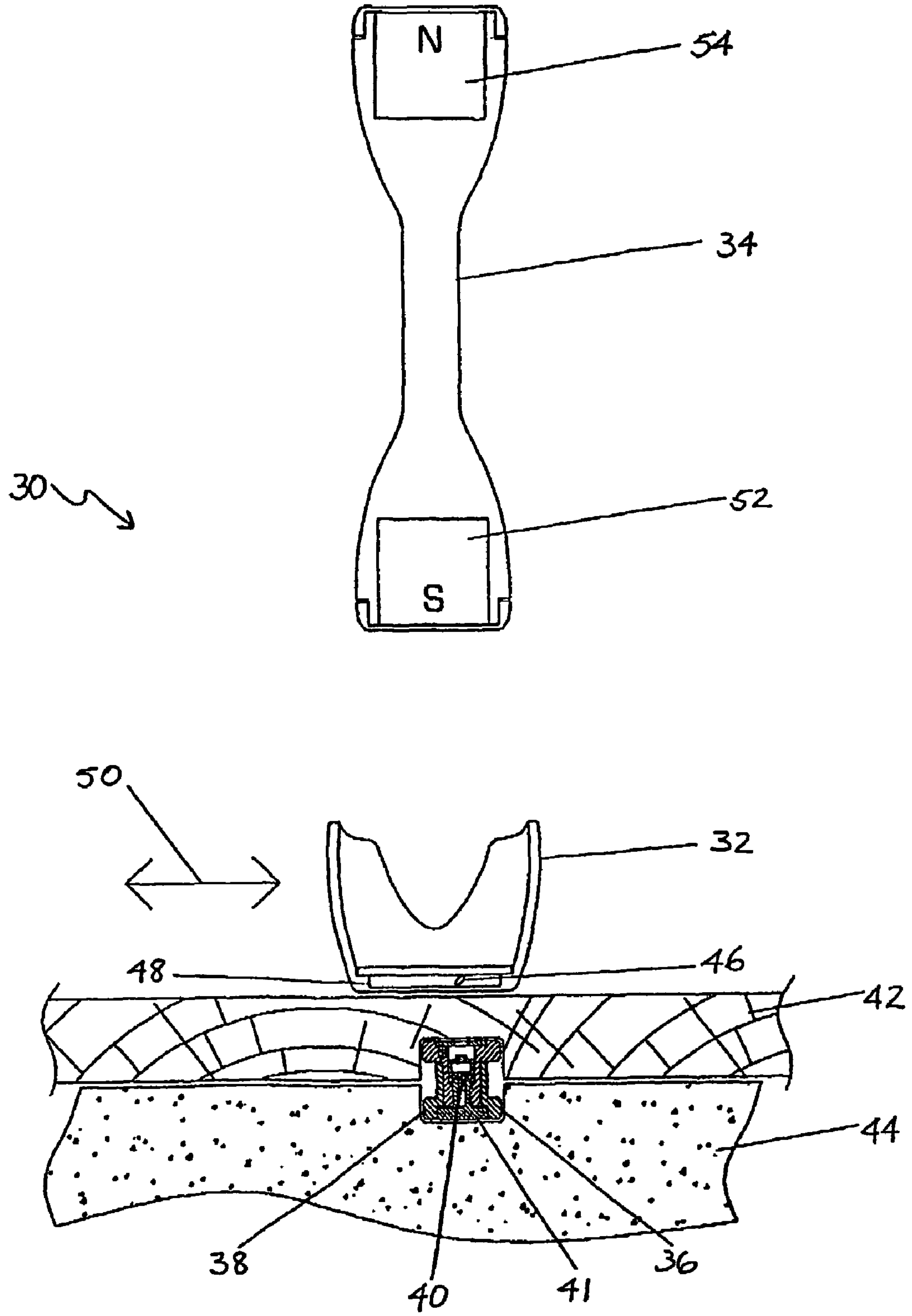
FIG. 2 is a front elevation of a second embodiment of a tool of the invention, being a two-part tool, showing part of the tool in proximity to a fastener. In this embodiment, part of the tool locates the fastener. The other part of the tool may then be manipulated in the appropriate way to release or fix the fastener.

Turning now to FIG. 2, tool 30 is in two parts, having detector cap 32 and permanent magnet carrier 34. Detector cap 32 is used to detect the location of fastening element 40 which forms part of a fastening assembly 38, as disclosed in International Patent Application No. PCT/AU99/00185. Fastener assembly 38 can be activated by magnetic means, with fastening element 40 being activatable to move towards concrete wall 42 in order to unlock fastener assembly 38 and towards wooden panel 44 in order to lock fastener assembly 38. Fastening element 40 locks part 36 which mates with second part 41.

FIGS. 6-21 illustrate various examples of fastening assemblies described in International Patent Application No. PCT/AU99/00185, incorporated by reference herein.

Figure 6:
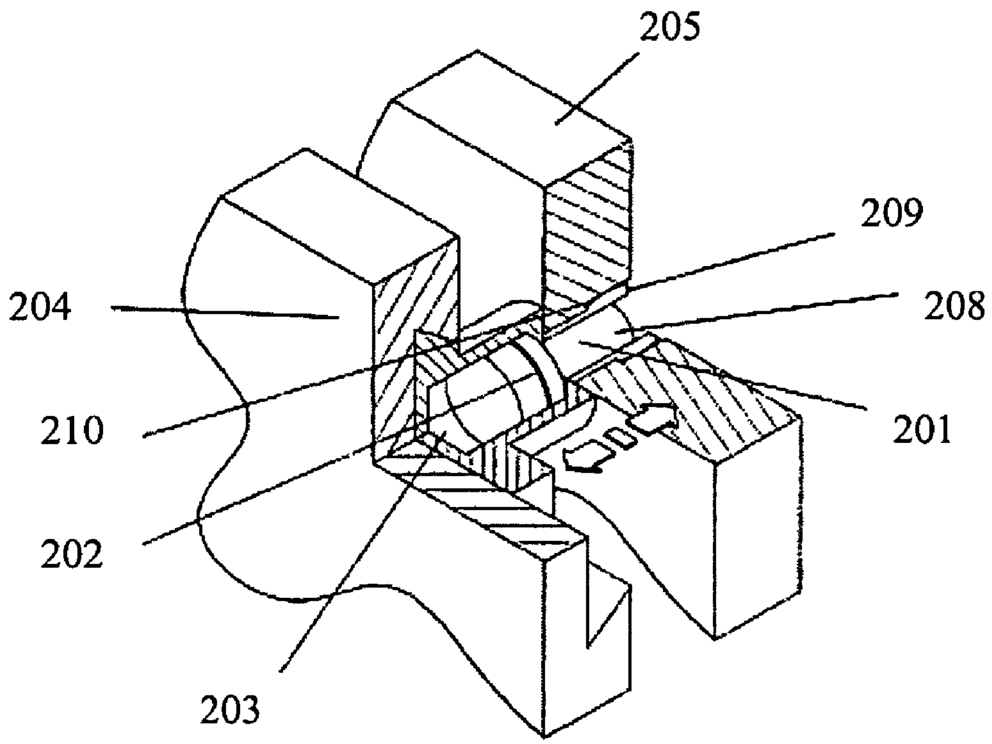
FIG. 6 is a perspective view, partly broken away, showing alignment of a first element with a second element before application of remote activation means to fix the first element to the second element.

Referring to FIG. 6, locking pin 201 is injection molded from a suitable plastic material and includes a metal strip 202. Locking pin 201 lies in recess 203 between first element 204 and second element 205. Recess 203 has a narrow end 206 which lies within element 205.

Figure 7:
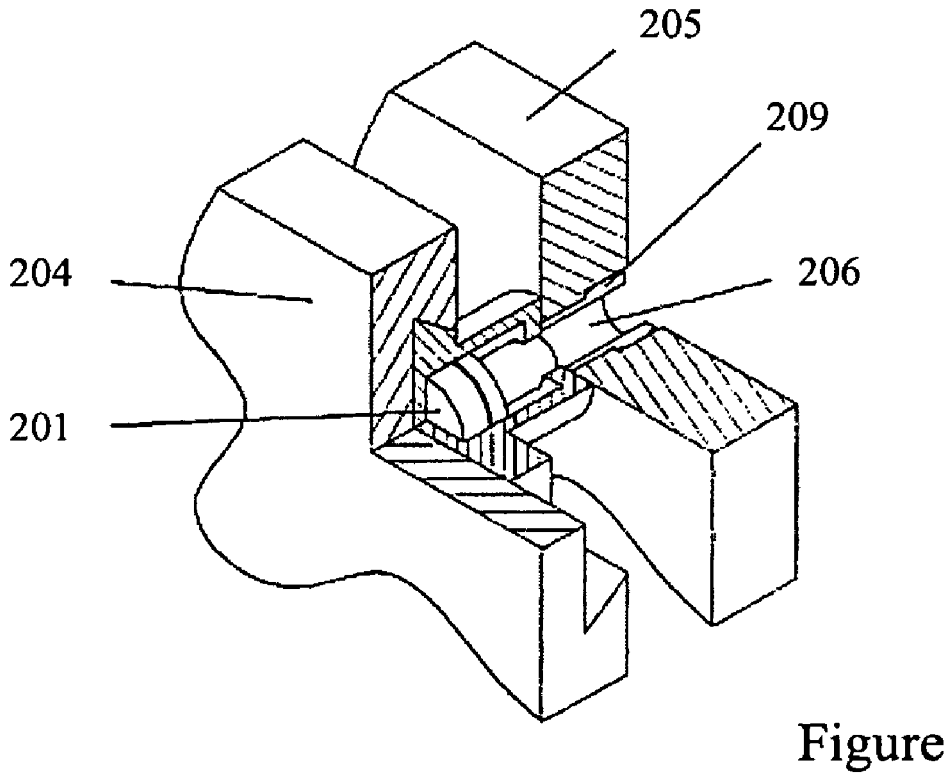
FIG. 7 is an enlarged view of the elements of FIG. 6 after the first element has been fixed to the second element by the application of remote activation means to a locking pin.

When a magnetic force is applied to locking pin 201, it is caused to move within recess 203 as shown in FIG. 7, so that leg 208 of locking pin 201 is pushed into narrow recess 206, in turn expanding wall 209 so that it locks into the recess 210 provided in element 205.

Locking pin 201 may be reversed, so that elements 204 and 205 may be released, by the use of magnetic force. Magnetic attraction may be applied for fixing elements 204 and 205 and magnetic repulsion for releasing them, or vice versa. Alternately, the same magnetic force may be applied on opposite sides—for example, on the side near element 204 for fixing and on the side near element 205 for releasing.

Figure 8:
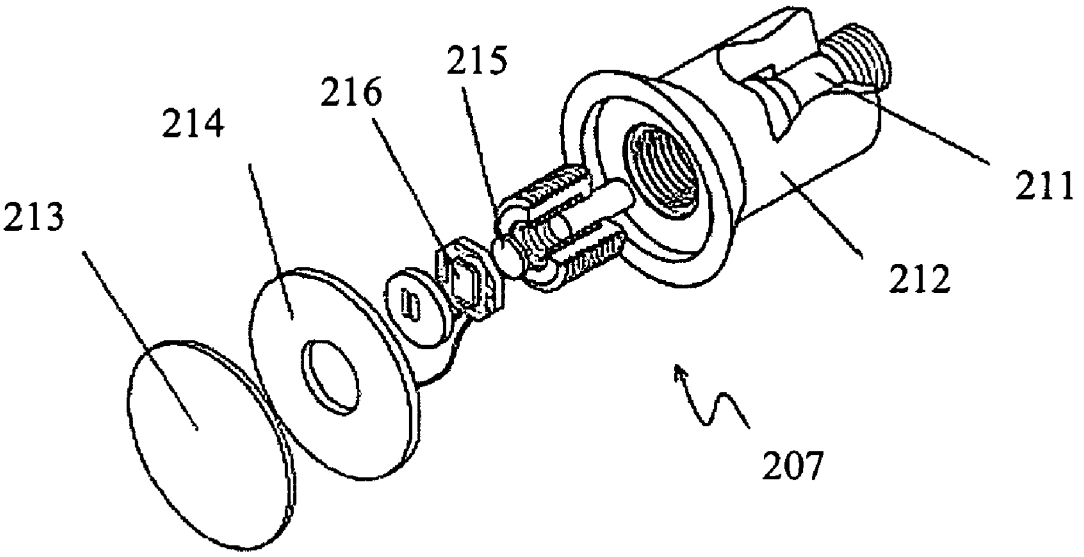
FIG. 8 shows in exploded form an isometric view of connecting means.
Figure 9:
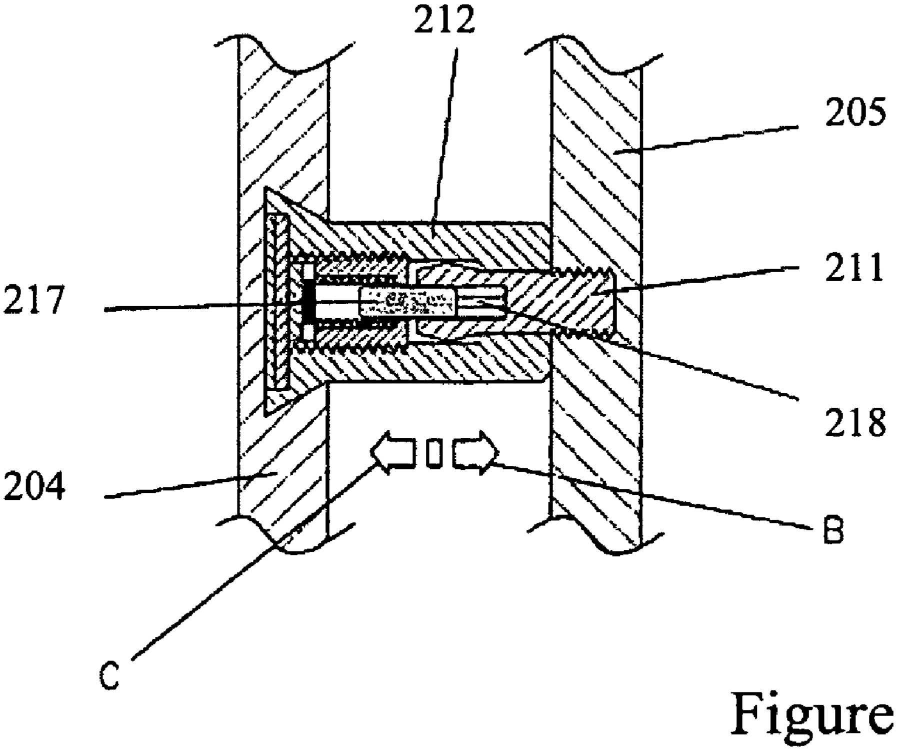
FIG. 9 shows in sectional view the connecting means of FIG. 8 in situ between first and second elements.

Turning now to FIG. 8, the connecting means 207 illustrated includes a wall plug 211 which can be screw threaded into second element 205 (refer FIG. 9) and a cooperating member 212 which includes aerial 213, capacitor 214, switch 215 and encryption logic chip 216. Cooperating member 212 is able to act as a receiver/transmitter and is inserted in first element 204.

To fix first element 204 to second element 205, plug 211 inserted in element 205 is aligned with member 212 inserted in element 204. A message is sent, for example, via radio waves, to aerial 213 in member 212 to activate switch 215 which in turn causes plug 217 to travel into cavity 218 in the direction of arrow B provided in wall plug 211. Element 204 is thus fixed to element 205.

Encryption logic chip 216 may be capable of providing a report as to whether the connection between element 204 and element 205 has been stressed, such as by an earthquake or tremor.

Alternately or in addition, the movement of plug 217 into cavity 218 may transmit a signal to other connecting means which may then be caused to activate. As indicated above, this can be useful in providing a predetermined sequence of fixing, so that a large panel may be fixed at the four corners first, followed by automatic activation of the other fixing points.

To release element 204 from element 205, a message can be sent via radio waves to aerial 213 in member 212 to activate switch 215 which will cause plug 217 to travel in the direction of arrow C. Plug 217 will be released from cavity 218 in plug 211 and element 204 can then be separated from element 205.

Figure 10:
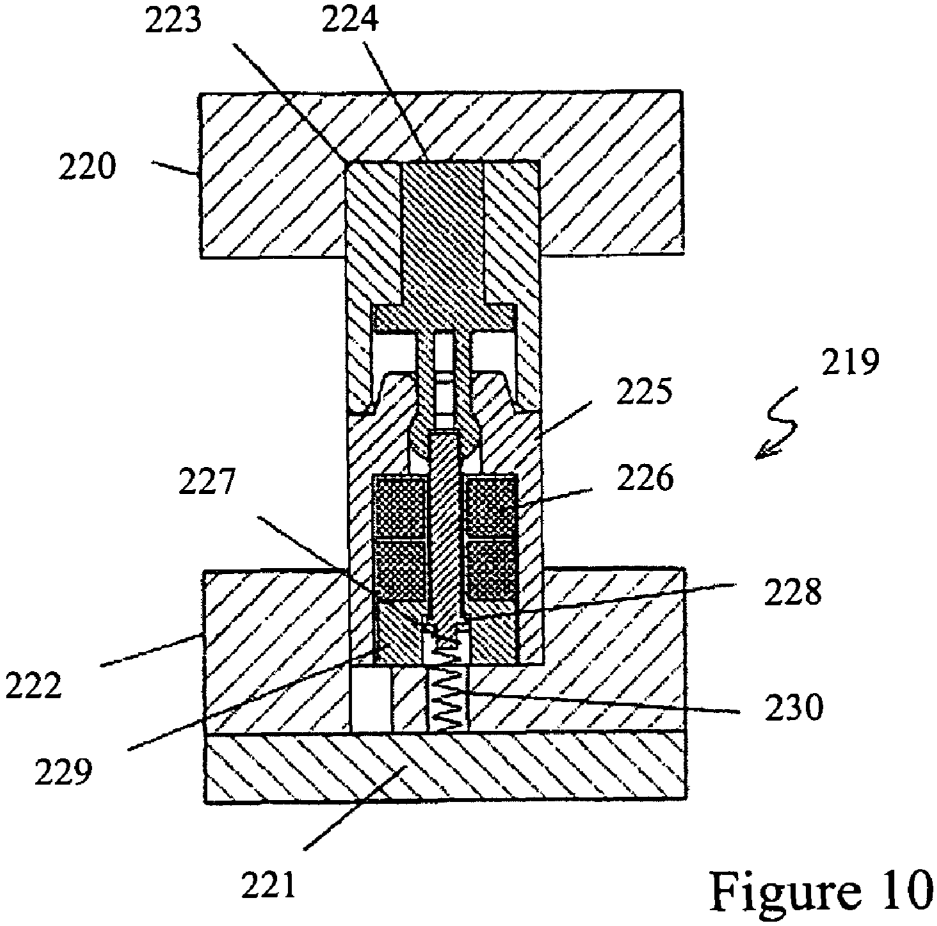
Figure 11:
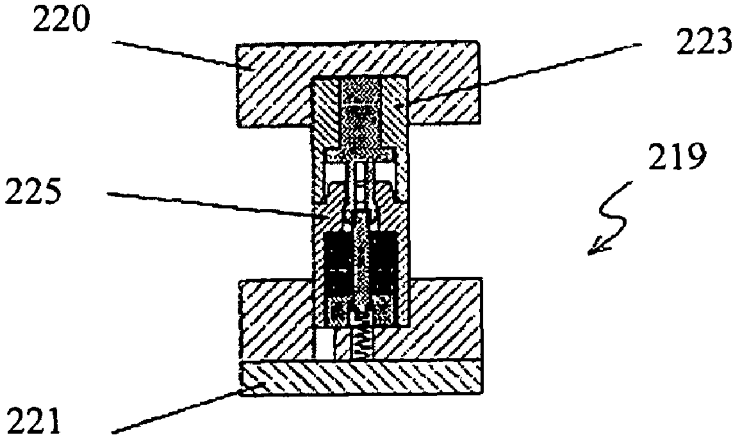
FIG. 11 shows the same view on a scale of 1:1, to show actual size.

With reference now to FIGS. 10 and 11, connecting means 219 is designed to be activated by electro magnetic means. Connecting means 219 has a top plate 220 of aluminium and a back fixing plate 221. Base plate 222 is of aluminium. Part 223 is made of acrylic material and surrounds nylon clip 224. Part 225 is also acrylic. Connecting means 219 also includes windings 226, washer 227, pin 228, bobin 229 (Teflon—trade mark) and spring 230.

As can be seen from FIG. 11, connecting means 219 in actual size is small and neat and eminently suitable for connecting a first element to a second element.

Figure 12:
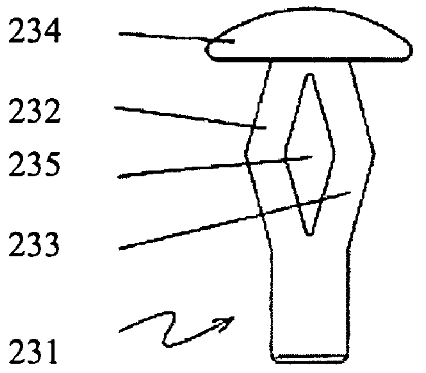
Figure 12 PRIOR ART
FIG. 12 shows in side elevation a prior art canoe clip, used, for example, to secure upholstery linings to vehicle doors, as well as many other applications.

The canoe clip 231 in FIG. 12 is a prior art clip with flexible arms 232 and 233 and a stud 234. As is well known in the art, canoe clip 231 is pushed into the desired cavity. Arms 232 and 233 compress to take up space 235 and once canoe clip 231 has been pushed sufficiently through the cavity so that arms 232 and 233 are no longer constrained, they spring out again to the configuration shown in FIG. 12, thus retaining canoe clip 231 in place.

Figure 13:
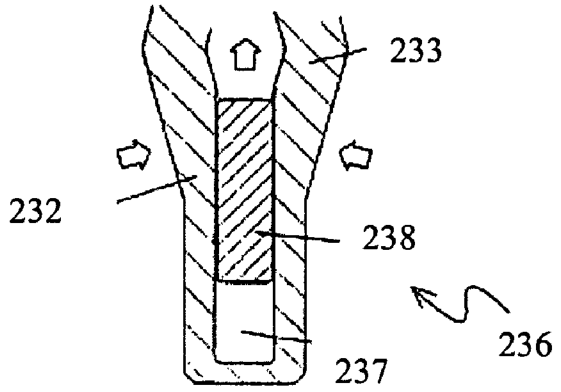
FIG. 13 shows in sectional view the lower part of a canoe clip modified to form a connecting means in accordance with the invention.

In the improvement to canoe clip 231 shown in FIG. 13 according to the invention, connecting means 236 shows how, if cavity 237 contains a moveable locking pin 238, activatable by remote means according to the invention, once connecting means 236 has been pushed into position, like the prior art canoe clip 231, locking pin 238 can be moved between arms 232 and 233 to prevent them coming together. Thus, connecting means 236 will fix first and second elements (not shown) together, until locking pin 238 is released by remote activation means.

Figure 14:
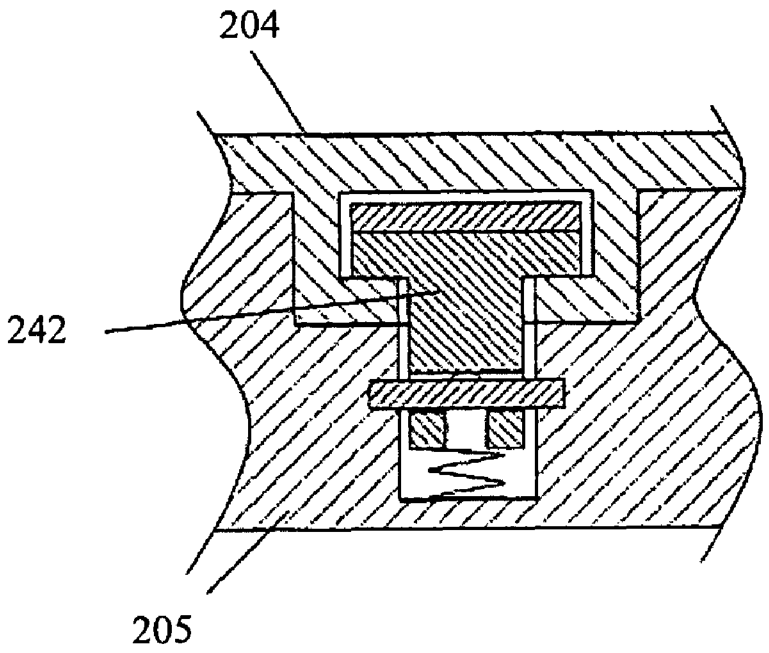
FIG. 14 is a sectional view of another form of connecting means according to the invention, shown in situ between a first element and a second element.
Figure 15:
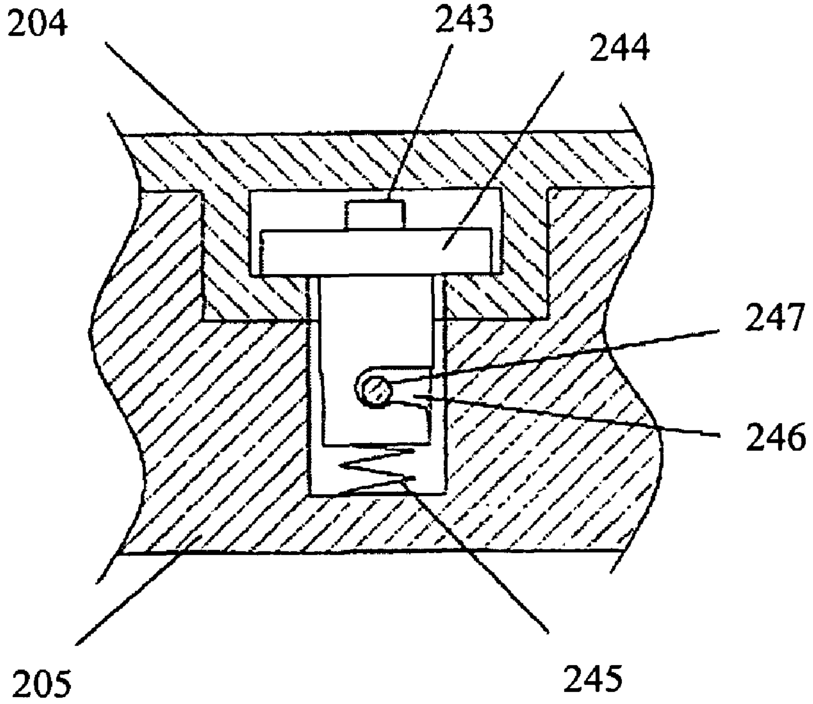
FIG. 15 shows the connecting means of FIG. 14 in the locked position.

With reference now to FIGS. 14 and 15, connecting means 242 is based on the known "quarter turn" fastener. Connecting means 242 is shown in position between first element 204 and second element 205. As can be seen from FIGS. 14 and 15, connecting means 242 does not breach the face surface of element 204, so that element 204 can present a completely blank face for aesthetic or security reasons. Connecting means 242 has a drive magnet 243 and a plunger 244, biased by spring 245. When plunger 244 is caused to press down against spring 245 and rotate, by magnetic or electromagnetic means, channel 246 engages rod 247 to hold connecting means 242 in the locked position, thus connecting elements 204 and 205. Elements 204 and 205 can be released by applying a remote activation means to rotate plunger 244 in the opposition direction, so that rod 247 is disengaged by channel 246.

Figure 16:
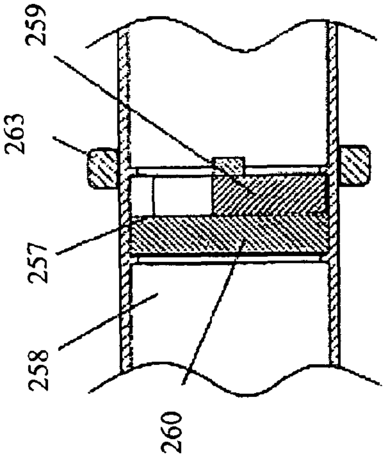
FIG. 16 is a sectional side view of a further embodiment of connecting means according to the invention, being in a valve with a single flow aperture.
Figure 17:
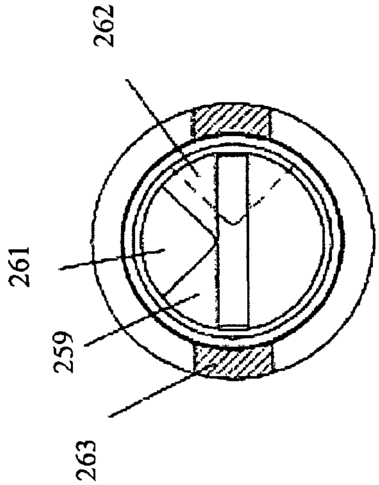
FIG. 17 is an end view of the valve of FIG. 16, showing the valve in the closed position.
Figure 18:
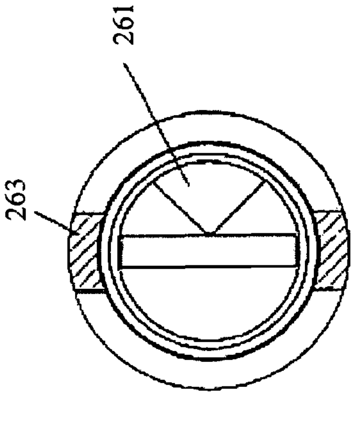
FIG. 18 is an end view of the valve of FIGS. 16 and 17, showing the valve in the open position.

With reference to FIGS. 16-18, connecting means 257 is a valve for controlling flow within conduit 258. Valve 257 had a metal disk, 259 and 260, each of which has a cut out portion 261 and 262 respectively. When cut out portion 261 is aligned with cut out portion 262, as in FIG. 18, connecting means 257 represent the valve in the open position, allowing fluid to flow along conduit 258 through valve 257. When disk 259 is rotated relatively to disc 260, as shown in FIG. 17, valve 257 is closed, preventing flow of fluid along conduit 258 through valve 257. Disk 259 can be rotated to the open or closed position in valve 257 by the application of remote activation means. Thus, valve 257 can be opened or closed in a sterile environment. This can have importance in hospitals and other medical applications, for example. Illustrated in FIGS. 16-18 is a magnetic locking ring 263 which causes disk 259 to rotate relatively to disk 260. It will be appreciated that valve 257 may be opened or closed by using means other than magnetic means.

Figure 19:
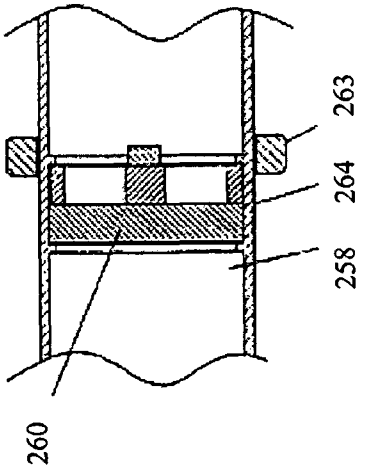
FIG. 19 is another version of a connecting means according to the invention in a valve having two flow holes.
Figure 20:
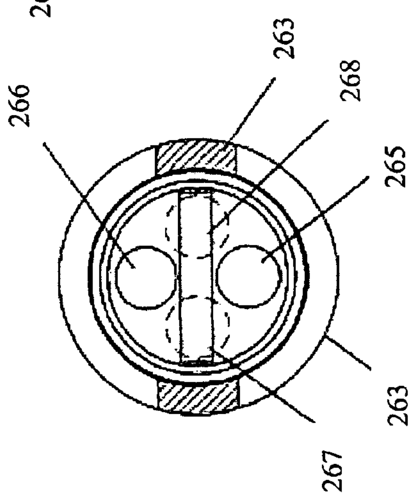
FIG. 20 is an end view of the valve in FIG. 19, showing the valve in the closed position.
Figure 21:
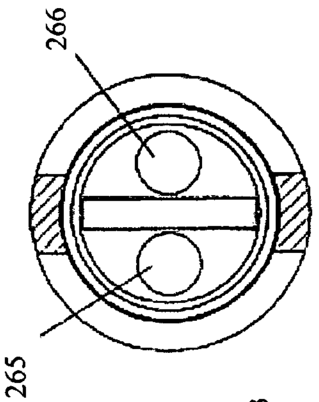
FIG. 21 shows the valve of FIGS. 19 and 20 with the valve open.

With reference now to FIGS. 19-21, connecting means 264 represents a double-apertured valve in conduit 258. Disk 259 is caused to rotate relatively to disk 260 by rotation of locking ring 263, as in the previous example. When apertures 265 and 266 on disk 259 are aligned with apertures 267 and 268 on disk 260, fluid can flow through valve 264, similarly, the flow of fluid can be halted by rotating locking ring 263 so that apertures 265 and 266 are not in alignment with apertures 267 and 268.

Referring back to FIG. 2, detector cap 32 includes a small detector magnet 46 which is free to move in compartment 48. Detector cap 32 is moved along wooden panel 44 in the direction of arrow 50 until small detector magnet 46 lies in the center of a transparent target (not shown) lying above compartment 48. Small detector magnet 46 will lie in the middle of the target when detector cap 32 is centered over fastener assembly 38.

At this stage, carrier 34 may be inserted in detector cap 32 with either the south large magnet 52 or the north large magnet 54 inserted in cap 32. If it is desired to move fastening element 40 to an unlocked position (towards concrete wall 42), south large magnet 52 is inserted in cap 32. Conversely, to lock fastener assembly 38 by moving fastening element 40 away from concrete wall 42 and towards wooden panel 44, north large magnet 54 is inserted in cap 32. It is to be understood that the appropriate large magnet 52 or 54 can be applied directly to wooden panel 44 rather than being inserted in cap 32, once the location of fastening element 40 has been established.

Fastening assembly 38 is made so that when fastening element 40 changes from a locked to an unlocked position or vice versa, an audible "click" is emitted. Consequently, there is no need to know whether fastener assembly 38 is in the locked or unlocked position before applying carrier 34. If no "click" is emitted, the state of fastening assembly 38 has not changed and carrier 34 should be reversed so that the large magnet of opposite polarity is presented to fastening assembly 38.

Figure 3:
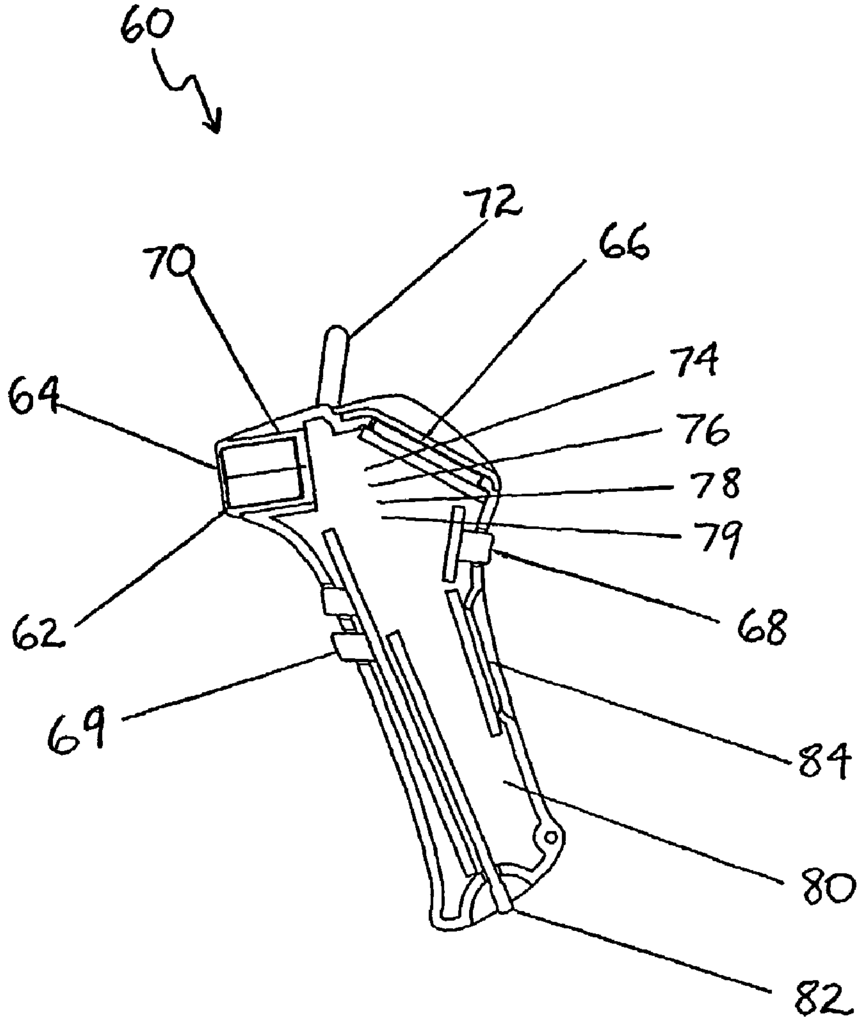
Figure 4:
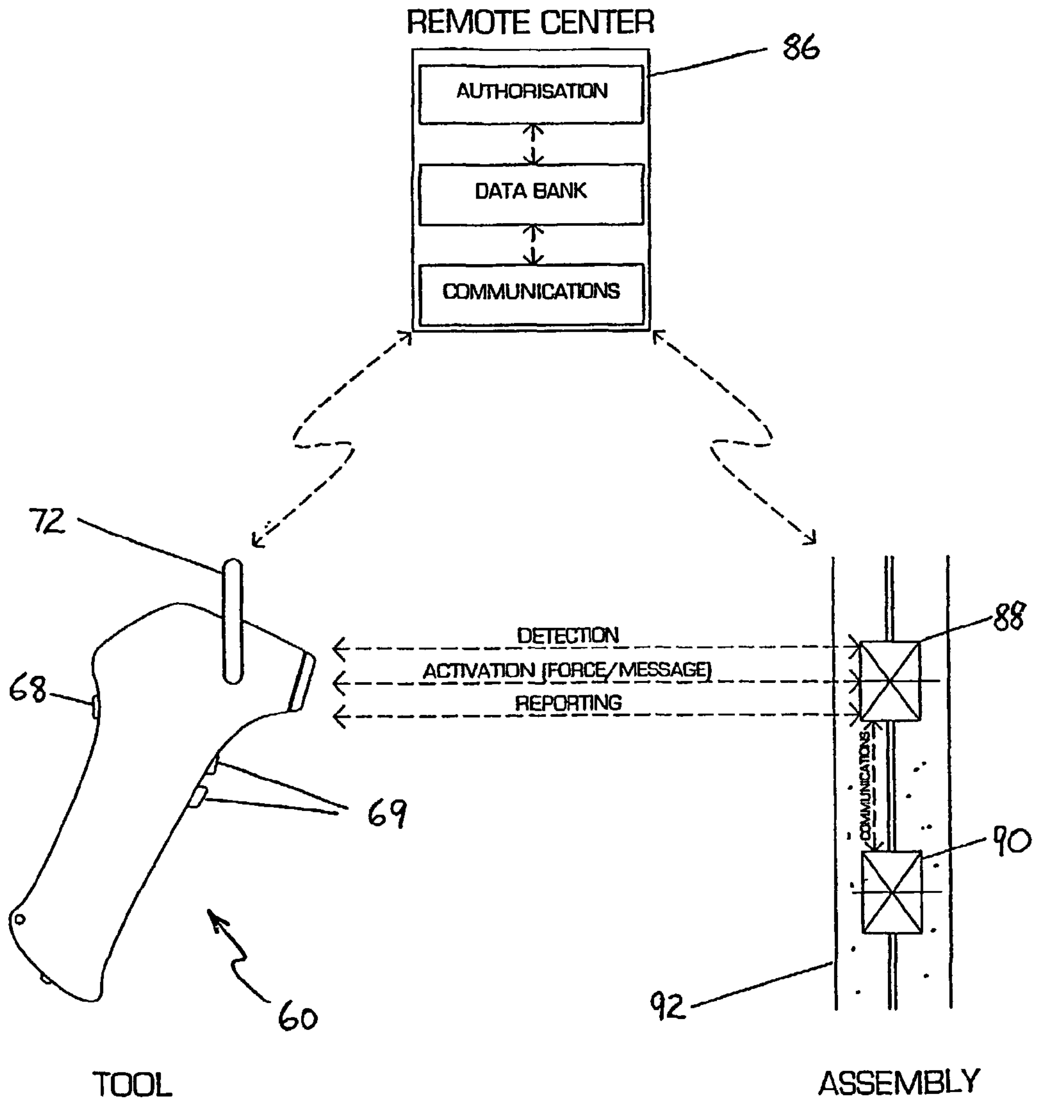
FIG. 4 shows a side elevation of the tool of FIG. 3 as part of a flow chart. In this embodiment, the tool can detect several attributes of a fastener, activate the fastener, and record relevant information.

The next embodiment, in FIGS. 3 and 4, is a somewhat more sophisticated version. Tool 60 has an actuator 62 and a detector 64 as well as a read-out screen 66 and user interface/menu selection buttons 68. Tool 60 also includes a modular head 70 (so that the module containing actuator 62 and detector 64 can be exchanged for a different module which may link to a different process of activation and/or detection).

Tool 60 also includes an aerial 72 for reception and transmission, communication module 74, processing module 76, memory module 78, and switching module 79. Tool 60 has power supply 80 and insertable external memory card 82. In the embodiment shown, tool 60 also has biometric authorization means 84, so that use of tool 60 can be authorized by detection of an acceptable thumb print, for example.

By use of buttons 68, tool 60 may be placed into any one of several different modes. In one mode, detector 64 can detect the location of a fastening element (not shown). In the same or a different mode, detector 64 can read fastening element information (for example, the type of fastener) and display this on screen 66. In yet another mode, detector 64 can diagnose the status of a fastening element—for example, whether the fastening element is in the fixed or released state or whether it has been damaged. Tool 60 may then interpret the action required in relation to a particular fastening element and display this on screen 66. In yet another mode, tool 60 can activate the fastening element to either couple it or release it as appropriate. Tool 60 can also record relevant information, by transferring it to the fastening element or by recording it in tool 60 itself or by transmitting it to a remote data center.

To further detail the type of functions of tool 60, it may locate the fastening element, interrogate it, determine its type and status, determine the sequence in which it must be activated, compared to other fastening elements, sense its environment (such as torque, pressure, temperature, etc.), or determine security issues, such as whether the person using tool 60 or tool 60 itself is authorized to activate the fastening element. Tool 60 can also display a service manual on screen 66 (the service manual may be stored on external memory card 82). Tool 60 can record the service history of the fastening element. Lastly, tool 60 can activate the fastening element.

Turning now to FIG. 4, tool 60 is shown in the flow chart in its relationship with remote center 86 and fastening elements 88 and 90 in wall assembly 92. As indicated, tool 60 can detect fastening element 88 and receive information from it. Tool 60 can activate fastening element 88 by applying a force or sending a message. Tool 60 can report to fastening element 88 and receive a report from fastening element 88.

While tool 60 can repeat these functions in relation to fastening element 90, it is also possible to have communication between fastening elements 88 and 90 themselves.

In summary, the link between tool 60 and fastening element 88 allows detection and reporting of position, type, status, sequence, history, environmental factors, authorization requirements and activation requirements. This can be done using infra red, radio frequency, electromagnetic, microwave, or ultrasound energy, amongst others. Tool 60 can also activate fastening element 88 using any of the above forms of energy and also by using digital instruction, alone or in combination with energy transmission and also variations such as electromagnetic pulse and induction.

The link between tool 60 and remote center 86 can permit the downloading of manuals, instructions, procedures and customer files, the giving of authorization, billing, encryption control of fasteners, the uploading of service information, diagnostics, information as to parts replaced, the facilitation of inventory, and the location and history of fastening elements.

Also shown is a link between remote center 86 and fastening element 88. This link can provide reports on status, relay history, provide diagnosis, and control encryption links.

While examples have been given above of the way in which functions carried out by tool 60 may be effected, it is to be understood that these functions may be carried out in any suitable way and, as will be appreciated by one skilled in the art, there already exists relevant technology which can be adapted for this purpose.

Figure 5:
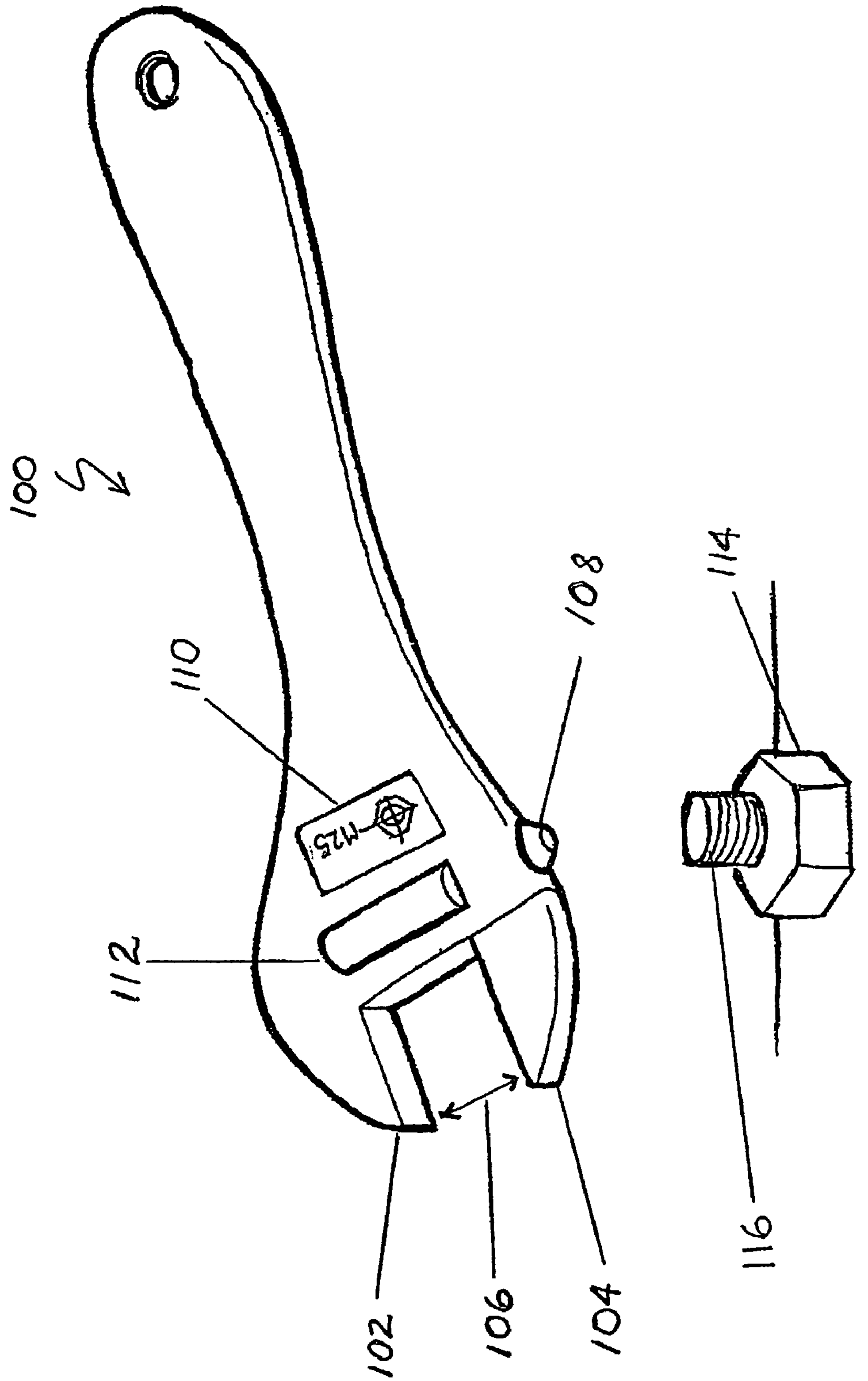
FIG. 5 shows a fourth embodiment of the tool of the invention, being a wrench with the ability to detect the size of a fastener, being a nut, and to automatically adjust the jaw span of the wrench.

With reference to FIG. 5, tool 100 is a wrench having jaws 102 and 104 adjustable in accordance with arrow 106. Wrench 100 includes detection unit 108, LCD screen 110, and actuating unit 112.

When tool 100 is brought into proximity to a fastener, in this case being nut 114, and actuating unit 112 is actuated, the size of nut 114 is detected by detection unit 108 and displayed on LCD screen 110. Once the size of nut 114 is detected, jaws 102 and 104 move towards or away from each other to automatically adjust so that tool 100 will precisely fit around nut 114 and can be used to loosen or tighten nut 114 around bolt 116.

It will be appreciated by one skilled in the art that the tool of the invention has widespread applicability in a very large range of fields and has the capacity to revolutionize the art of fixing and release of fasteners.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A tool for fixing or releasing a fastening element by remote activation, the tool comprising:

means for fixing or releasing the fastening element without direct physical contact between the tool and the fastening element; and means for detecting an attribute of the fastening element, wherein the attribute is selected from the group consisting of:

location of the fastening element, fixed or released status of the fastening element, identity of the fastening element, one or more environmental factors affecting the fastening element, size of the fastening element, position of the fastening element in a predetermined sequence of activation of fastening elements, history of the fastening element, authorization requirements of the fastening element, and nature of energy required for remote fixing or releasing of the fastening element; and wherein the means for fixing or releasing the fastening element is adapted to cause a locking element to move along a channel to and from a fixed position, wherein the locking element blocks a moveable member.

2. The tool of claim 1, further comprising a plurality of parts.

3. The tool of claim 1, wherein the means for detecting detects a plurality of attributes of the fastening element.

4. The tool of claim 1, further comprising means for displaying information relating to the fastening element.

5. The tool of claim 1, further comprising means for recording information relating to the fastening element.

6. The tool of claim 1, further comprising means for transmitting information relating to the fastening element.

7. The tool of claim 1, further comprising means for receiving a report from the fastening element.

8. The tool of claim 7, further comprising means for transmitting the received report.

9. The tool of claim 1, further comprising means for accepting information from a source other than the fastening element.

10. The tool of claim 9, wherein the means for accepting the information from the other source further comprises means for downloading the information or means for accepting the information from a memory card inserted in the tool.

11. The tool of claim 1, wherein the means for detecting uses infra red, radio frequency, electromagnetic, microwave, or ultrasound technology to detect at least one of the attributes.

12. The tool of claim 1, wherein the means for remote fixing or releasing uses energy transmission selected from the group consisting of infra red, radio frequency, electromagnetic, microwave, and ultrasound energy to activate the fastening element.

13. The tool of claim 1, wherein the means for detecting is adapted to operate via a remote center.

* * * * *